United States Patent Office 2,784,181
Patented Mar. 5, 1957

2,784,181

PROCESS OF MAKING DIHYDROSTREPTOMYCIN

Herman Sokol, Hasbrouck Heights, and Robert P. Popino, West Windsor Township, Mercer County, N. J., assignors, by mesne assignments, to American Cyanamid Company, New York, N. Y., a corporation of Maine No Drawing. Application May 15, 1953, Serial No. 355,413

4 Claims. (Cl. 260—210)

The subject of this invention relates particularly to a process of producing dihydrostreptomycin and the salts thereof.

This application is a continuation-in-part of our application Serial No. 121,052, filed October 12, 1949, now abandoned.

Dihydrostreptomycin is a derivative, obtained by the addition thereto of two hydrogen atoms to streptomycin, an antibiotic, the chemical constitution of which is known to be of a basic character and to contain at least two guanidine groups, one amino group and an aldehyde group. The addition of the two hydrogen atoms, reduces the aldehyde group to the corresponding alcohol.

In general, the said process may be effected by hydrogenation of the streptomycin in the presence of a suitable catalyst, preferably comprising or containing one of the precious metals, or a compound thereof, which may or may not be accompanied by a suitable carrier material for the same, as for instance charcoal or alumina. The hydrogenation process is conducted at any desired temperature, but preferably at a somewhat elevated temperature, for instance from 20 to 40° C., so as to increase the rate of hydrogenation, and temperatures up to 60° C., for example, have been found to have no detrimental effect, although a temperature such as 40° C. has been found to be quite satisfactory. Also, any desired hydrogen pressure may be used, but pressures of 5–25 lbs./in.$^2$ have been found to be very satisfactory, although still higher pressures may be utilized, but without obtaining any significant increase in the rate of hydrogenation.

While our invention may be conducted in various ways, and for the production of many different products, for the purpose of illustration, we have described hereinafter only certain embodiments thereof by way of example.

The streptomycin utilized in carrying out our invention may be obtained in any desired manner, from fermentation broths, in accordance with the purification method described in detail in the copending application of one of us upon Process of Purifying Streptomycin, executed September 12, 1949, filed October 12, 1949, Serial Number 121,053.

Accordingly, we may proceed, for instance, in accordance with any of the following Examples 1 to 6, in which the proportions are by weight unless otherwise stated:

Example 1

A solution containing 30.7 grams of streptomycin sulfate at a purity of 750 mcg./mg. (micrograms per milligram) in water and having a concentration of approximately 250,000 mcg./ml., is agitated in a hydrogenation apparatus at a hydrogen pressure of 5 lbs./in.$^2$ for 25 hours at 22–25° C. in the presence of 236 mg. of platinum oxide as a catalyst. A quantitative recovery is effected of dihydrostreptomycin sulfate containing 0.5% of unreduced streptomycin sulfate. The dihydrostreptomycin sulfate shows a purity of 755 mcg./mg.

Example 2

A solution containing 25.0 grams of streptomycin sulfate at a purity of 772 mcg./mg., in water and having a concentration of approximately 250,000 mcg./ml., is agitated in a hydrogenation apparatus at a hydrogen pressure of 15 lbs./in.$^2$ for 22 hours at 22–25° C. in the presence of 200 mg. of platinum oxide as a catalyst. A quantitative recovery is effected of dihydrostreptomycin sulfate of 797 mcg./mg. purity and containing 0.2% of unreduced streptomycin sulfate.

Example 3

A solution containing 25.0 grams of streptomycin sulfate at a purity of 772 mcg./mg., in water and having a concentration of approximately 250,000 mcg./ml., is agitated in a hydrogenation apparatus at a hydrogen pressure of 15 lbs./in.$^2$ for 6 hours at 40° C. in the presence of 200 mg. of platinum oxide as a catalyst. A quantitative recovery is effected of dihydrostreptomycin sulfate of 787 mcg./mg. purity and containing 0.3% of unreduced streptomycin sulfate.

Example 4

A solution containing 12,900 grams of streptomycin sulfate at a purity of 745 mcg./mg., in water and having a concentration of approximately 350,000 mcg./mg., is agitated in a hydrogenation apparatus at a hydrogen pressure of 25 lbs./in.$^2$ for 22 hours at 22–25° C. in the presence of 100.0 grams of platinum oxide as a catalyst. A quantitative recovery is effected of dihydrostreptomycin sulfate of 750 mcg./mg. purity and containing 0.5% of unreduced streptomycin sulfate.

Example 5

A solution containing 25.0 grams of streptomycin sulfate at a purity of 772 mcg./mg., in water and having a concentration of approximately 250,000 mcg./ml., is agitated in a hydrogenation apparatus at a hydrogen pressure of 15 lbs./in.$^2$ for 23 hours at 33° C. in the presence of 2.00 grams of a catalyst consisting of charcoal containing 5% platinum. A quantitative recovery is effected of dihydrostreptomycin sulfate of 735 mcg./mg. purity and containing 0.1% of unreduced streptomycin sulfate.

Example 6

A solution containing 25.0 grams of streptomycin sulfate at a purity of 772 mcg./mg., in water and having a concentration of approximately 250,000 mcg./ml., is agitated in a hydrogenation apparatus at a hydrogen pressure of 15 lbs./in.$^2$ for 24 hours at 33° C. in the presence of 2.00 grams of a catalyst consisting of charcoal containing 5% palladium. A quantitative recovery is effected of dihydrostreptomycin sulfate of 712 mcg./mg. purity and containing 1.9% of unreduced streptomycin sulfate.

For the catalysts in any of the above examples we may use any of the precious metal catalysts of the following types: (1) platinum oxide (Adams catalyst), or (2) charcoal, granular or otherwise, containing 5% platinum, or (3) charcoal, granular or otherwise, containing 5% palladium.

Preferably, the platinum oxide catalyst may be used in a ratio of not more than one gram of catalyst per 100 grams of streptomycin free base. In the case of the charcoals containing 5% platinum or 5% palladium, the concentration preferably used is 10 grams of catalytic material per 100 grams of streptomycin free base, which is equivalent to an amount of precious metal catalyst of 0.5 g./100 grams of streptomycin free base. The use of such a small amount of the expensive catalyst reduces the cost. While the catalyst is recovered, there is always some loss and this cost is reduced by using only a small amount of catalyst.

As to the concentration of the streptomycin utilized, the range of streptomycin concentration preferably employed is 250,000 to 350,000 mcg./ml. in the aqueous solution of streptomycin sulfate.

The use of such a high concentration is preferred as it greatly reduces the amount of water which must be removed during the subsequent freeze drying of the material. The freeze drying process is complex and expensive and appreciable economies are effected by using this high concentration and thereby reducing the amount of water present for a given quantity of streptomycin. This high concentration of streptomycin materially increases the viscosity of the solution. In order to effect hydrogenation the hydrogen must be soluble in the solution and has to migrate through the solution to the catalyst surface. The streptomycin must diffuse through the solution to the surface of the catalyst and the dihydrostreptomycin has to be disolved from the catalyst surface. Despite the fact that the increase in viscosity would be expected to hinder this phenomena and require the use of relatively large amounts of catalyst, it has been discovered that amounts of catalyst as small as one part of catalyst to about 100 parts, or more, of streptomycin could be used and the streptomycin substantially completely hydrogenated.

When the dihydrostreptomycin sulfate is crystallized from solution, the use of high concentrations of the antibiotic is also of great advantage since there is less antibiotic lost in the mother liquor. This is because the crystallization is based on a procedure of crystallizing from a solvent-aqueous system containing a sufficient quantity of solvent to form a two-phase system just slightly supersaturated with respect to the antibiotic component. Thus, the higher the antibiotic concentration, the smaller the volume of the solvent-water system required to produce this supersaturation and accordingly the smaller the volume of mother liquor and the attendant loss of antibiotic.

The above operation may be carried out preferably over a temperature range 20 to 40° C. The effect of the increased temperature is to increase the rate of hydrogenation. Temperatures above 40° C. and up to 60° C. or higher may be employed with no detrimental effect but the more moderate limit of 40° C. has been found to be quite satisfactory.

Hydrogen pressures of 5-25 lbs./in.$^2$ have been successfully employed in the hydrogenation. Still higher pressures may be used, but have been found not to increase the rate of hydrogenation significantly.

We claim:

1. A process which comprises treating with hydrogen a relatively viscous, highly concentrated aqueous solution containing from about 250,000 to about 350,000 micrograms per milliliter of streptomycin sulfate in the presence of a noble metal catalyst at a temperature of from about 20° to about 40° C. and at a hydrogen pressure of from about 5 to about 25 lbs. per square inch for producing a substantially quantitative yield of dihydrostreptomycin sulfate, said hydrogenation catalyst being present in an amount not greater than 1 unit by weight for approximately from about 100 to about 200 units by weight of streptomycin in the form of its free base.

2. A process which comprises treating with hydrogen a relatively viscous, highly concentrated aqueous solution containing from about 250,000 to about 350,000 micrograms per milliliter of streptomycin sulfate in the presence of platinum oxide as a hydrogenation catalyst at a temperature of from about 20° to about 40° C. and at a hydrogen pressure of from about 5 to about 25 lbs. per square inch for producing a substantially quantitative yield of dihydrostreptomycin sulfate, said hydrogenation catalyst being present in an amount not greater than 1 unit by weight for approximately each 100 units by weight of streptomycin in the form of its free base.

3. A process which comprises treating with hydrogen a relatively viscous, highly concentrated aqueous solution containing from about 250,000 to about 350,000 micrograms per milliliter of streptomycin sulfate in the presence of metallic platinum as a hydrogenation catalyst at a temperature of from about 20° to about 40° C. and at a hydrogen pressure of from about 5 to about 25 lbs. per square inch for producing a substantially quantitative yield of dihydrostreptomycin sulfate, said hydrogenation catalyst being present in a ratio of 1 unit by weight for approximately 200 units by weight of streptomycin in the form of its free base.

4. A process which comprises treating with hydrogen a relatively viscous, highly concentrated aqueous solution containing from about 250,000 to about 350,000 micrograms per milliliter of streptomycin sulfate in the presence of metallic palladium as a hydrogenation catalyst at a temperature of from about 20° to about 40° C. and at a hydrogen pressure of from about 5 to about 25 lbs. per square inch for producing a substantially quantitative yield of dihydrostreptomycin sulfate, said hydrogenation catalyst being present in a ratio of 1 unit by weight for approximately 200 units by weight of streptomycin in the form of its free base.

References Cited in the file of this patent
UNITED STATES PATENTS

| | | |
|---|---|---|
| 2,498,574 | Peck | Feb. 21, 1950 |
| 2,522,858 | Carboni et al. | Sept. 19, 1950 |
| 2,552,547 | Fried et al. | May 15, 1951 |
| 2,565,653 | Fried et al. | Aug. 28, 1951 |